(12) United States Patent
Crary et al.

(10) Patent No.: US 10,319,256 B2
(45) Date of Patent: Jun. 11, 2019

(54) DEVICE FOR SIMULATING ANALYSIS OF BLOOD GLUCOSE LEVELS

(71) Applicant: POCKET NURSE ENTERPRISES, INC., Monaca, PA (US)

(72) Inventors: Wendy M. Crary, Cambria, WI (US); Anthony J. Battaglia, Jr., Hookstown, PA (US)

(73) Assignee: Pocket Nurse Enterprises, Inc., Monaca, PA (US)

( * ) Notice: Subject to any disclaimer, the term of this patent is extended or adjusted under 35 U.S.C. 154(b) by 0 days.

(21) Appl. No.: 15/266,360

(22) Filed: Sep. 15, 2016

(65) Prior Publication Data

US 2017/0004735 A1    Jan. 5, 2017

Related U.S. Application Data

(63) Continuation-in-part of application No. 15/075,491, filed on Mar. 21, 2016, now abandoned, which is a continuation of application No. 14/169,516, filed on Jan. 31, 2014.

(60) Provisional application No. 61/810,420, filed on Apr. 10, 2013.

(51) Int. Cl.
    *G09B 19/24* (2006.01)
    *G09B 23/28* (2006.01)
    *G09B 5/02* (2006.01)

(52) U.S. Cl.
    CPC .............. *G09B 19/24* (2013.01); *G09B 5/02* (2013.01); *G09B 23/28* (2013.01)

(58) Field of Classification Search
    CPC .... G09B 23/28; G09B 23/281; G09B 23/283; G09B 23/285; G09B 23/286; G09B 23/288; G09B 23/30; G09B 23/303; G09B 23/306; G09B 23/32; G09B 23/34; G09B 5/00; G09B 5/02; G09B 19/24
    See application file for complete search history.

(56) References Cited

U.S. PATENT DOCUMENTS

| 4,459,113 A | 7/1984 | Boscaro Gatti et al. | |
|---|---|---|---|
| 5,333,106 A * | 7/1994 | Lanpher | G09B 5/02 128/200.12 |
| 7,811,090 B2 * | 10/2010 | Eggert | G09B 23/28 434/273 |
| 2004/0152065 A1 * | 8/2004 | Witkowski | G09B 5/00 434/365 |
| 2005/0084831 A1 | 4/2005 | Ison et al. | |

(Continued)

*Primary Examiner* — Timothy A Musselman
(74) *Attorney, Agent, or Firm* — The Webb Law Firm (57) ABSTRACT

Disclosed is a method and apparatus for providing a realistic training environment for health care and patient care providers using a simulated medical device. The method can include actuating a first actuator of the simulated medical device that turns on the device and then actuating a second actuator of the device, where, in response to the actuation of the second actuator, the user is prompted to simulate scanning a bar code. In response to actuating a third actuator, a light can illuminate. The method can further include inserting a test strip into a slot of the device and, in response to the insertion of the test strip, the device can initiate a pre-set timer countdown where, at the completion of the countdown, the visual display can display a simulated medical value.

9 Claims, 7 Drawing Sheets

(56) References Cited

U.S. PATENT DOCUMENTS

| | | | |
|---|---|---|---|
| 2007/0056582 A1* | 3/2007 | Wood | A61B 5/0059 128/200.24 |
| 2014/0065589 A1 | 3/2014 | Zamierowski et al. | |
| 2015/0044655 A1* | 2/2015 | Samosky | G09B 23/285 434/267 |
| 2016/0120751 A1* | 5/2016 | Mounce | A61M 5/20 604/189 |

* cited by examiner

DEVICE FOR SIMULATING ANALYSIS OF BLOOD GLUCOSE LEVELS

CROSS REFERENCE TO RELATED APPLICATIONS

This application is a continuation-in-part of co-pending U.S. application Ser. No. 15/075,491, filed Mar. 21, 2016, which is a continuation of U.S. application Ser. No. 14/169,516, filed Jan. 31, 2014, now U.S. Pat. No. 9,293,064, which claims the benefit of U.S. Provisional Application No. 61/810,420, filed Apr. 10, 2013, all of which are incorporated by reference herein.

BACKGROUND OF THE INVENTION

Field of the Invention

The present application relates generally to a device for simulating medical values.

Description of Related Art

Health care or patient care providers must be trained to use various medical devices and to perform diagnosis and treatment of patients. However, an individual playing the role of a patient in a training scenario cannot actually exhibit the vital signs or symptoms of a medical condition. For example, a patient actor cannot fake a high temperature, high blood pressure, or a blood glucose level. Moreover, the patient actors cannot truly respond to a treatment regimen such that their physical condition or vitals react to the treatment.

Furthermore, actual medical devices used for treating patients in real medical scenarios are often prohibitively expensive or otherwise unavailable for use in training situations. Moreover, these devices are configured to generate true readings and measurements, not provide readings or measurements for a specific training scenario. Health care or patient care providers, however, must still learn to use these devices to diagnose and treat patients.

SUMMARY OF THE INVENTION

Generally, provided is a device for simulating a medical value that provides a realistic training environment for health care or patient care providers. In one example, the simulated medical device can be a blood glucose simulator that simulates blood glucose levels, and can be configured to provide readings or measurements for one or more training scenarios. Disclosed is a simulated medical device that is less expensive to produce and/or operate than a corresponding medical device that performs in real medical situations readings or measurements.

According to a preferred and non-limiting embodiment, disclosed is a simulated medical device for providing a realistic training environment for health care or patient care providers that can include a visual display, a microprocessor connected to the visual display, and a memory connected to the microprocessor. The memory can store non-transitory computer readable program codes for operation of the microprocessor and one or more data values. The simulated medical device can further include a first actuator, connected between a power supply and the microprocessor, where in response to actuation of the first actuator, the microprocessor receives power from the power supply. The simulated medical device can further include a body housing the visual display, the microprocessor, the memory, and the first actuator. The body can further include a slot in the body, a light supported by the body, and a strip insertion sensor can be configured to provide to the microprocessor an indication of the presence of a test strip in the slot.

In another example, the first actuator can be a mechanical switch or a virtual switch displayed on the visual display by the microprocessor and operating under the control of the non-transitory computer readable program code.

In another example, the slot can be configured to receive internally at least a portion of the test strip.

In another example, the light can be positioned at a proximal end of the slot.

In another example, the simulated medical device can further include a second actuator connected between a power supply and the light. The light can illuminate in response to actuation of the second actuator.

In another example, the second actuator can be a mechanical switch or a virtual switch displayed on the visual display by the microprocessor operating under the control of the non-transitory computer readable program code.

In another example, each data value can be a simulated medical value or text. In another example, the microprocessor, running under the control of the non-transitory computer readable program code, can perform the following steps: in response to receiving power from the power supply, the microprocessor can display on the visual display a third actuator; in response to actuation of the third actuator, the microprocessor can display a prompt on the visual display; in response to the strip insertion sensor sensing at least a portion of the test strip internally received in the slot, initiates a pre-set timer countdown; and in response to the pre-set timer countdown completion, the microprocessor can display a first simulated medical value of the plurality of simulated values.

In another example, the microprocessor, running under the control of the non-transitory computer readable program code, can further perform the following steps: in response to another actuation of the third actuator, the microprocessor can display another prompt on the visual display; in response to the strip insertion sensor sensing at least a portion of the test strip internally received in the slot, initiates a pre-set timer countdown; and in response to the pre-set timer countdown completion, the microprocessor can display a second simulated medical value of the plurality of simulated values.

In another example, the microprocessor can be configured to store values of the simulated medical values in the memory based at least in part on user input.

In another example, the simulated medical device can further include an interface. The interface can receive wireless signals including data from an external wireless transmitter, the interface can provide the data included in the received wireless signals to the microprocessor, and the microprocessor can be configured to set the values of the at least one simulated medical value based at least in part on the data included in the received wireless signals.

In another non-limiting and preferred embodiment, disclosed is a method for providing a realistic training environment for health care and patient care providers using a simulated medical device. The method can include actuating a first actuator of the simulated medical device that turns on the simulated medical device, and following, actuating a second actuator of the simulated medical device. The method can then further include prompting the user to simulate scanning a first bar code in response to the actuation of the second actuator.

In another example, the method can further include actuating a third actuator in response to prompting the user to simulate scanning a first bar code in response to the actuation of the second actuator, and causing a light of the simulated medical device to illuminate in response to the actuation of the third actuator.

In another example, the method can further include, inserting a test strip into a slot of the simulated medical device following the step of causing a light of the simulated medical device to illuminate in response to the actuation of the third actuator, and a pre-set timer countdown is initiated in response to the insertion of the test strip into the slot. In response to the completion of the pre-set timer countdown, simulated medical device displaying on a visual display a simulated medical value in response to the insertion of the test strip into the slot.

Further preferred and non-limiting embodiments or aspects are set forth in the following numbered clauses.

Clause 1: Disclosed is a simulated medical device for providing a realistic training environment for health care or patient care providers, the device comprising: a visual display; a microprocessor connected to the visual display; a memory connected to the microprocessor and storing non-transitory computer readable program code for operation of the microprocessor and one or more data values; a first actuator connected between a power supply and the microprocessor, wherein in response to actuation of the first actuator the microprocessor receives power from the power supply; and a body housing the visual display, the microprocessor, the memory, and the first actuator, the body further including: a slot in the body; a light supported by the body; and a strip insertion sensor configured to provide to the microprocessor an indication of the presence of a test strip in the slot.

Clause 2: The simulated medical device of clause 1, wherein the first actuator can be a mechanical switch or a virtual switch displayed on the visual display by the microprocessor operating under the control of the non-transitory computer readable program code.

Clause 3: The simulated medical device of clause 1 or 2, wherein the slot can be configured to receive internally at least a portion of the test strip.

Clause 4: The simulated medical device of any of clauses 1-3, wherein the light can be positioned at a proximal end of the slot.

Clause 5: The simulated medical device of any of clauses 1-4 can further comprise a second actuator connected between a power supply and the light. The light can illuminate in response to actuation of the second actuator.

Clause 6: The simulated medical device of any of clauses 1-5, wherein the second actuator can be a mechanical switch or a virtual switch displayed on the visual display by the microprocessor operating under the control of the non-transitory computer readable program code.

Clause 7: The simulated medical device of any of clauses 1-6, wherein: each data value can be simulated medical values or texts; and the microprocessor, running under the control of the non-transitory computer readable program code, can perform the following steps: in response to receiving power from the power supply, display on the visual display a third actuator; in response to actuation of the third actuator, display a prompt on the visual display; in response to the strip insertion sensor sensing at least a portion of the test strip internally received in the slot, initiates a pre-set timer countdown; and in response to the pre-set timer countdown completion, display a first simulated medical value of the plurality of simulated values.

Clause 8: The simulated medical device of any of clauses 1-7, wherein the microprocessor, running under the control of the non-transitory computer readable program code, can further perform the following steps: in response to another actuation of the third actuator, display another prompt on the visual display; in response to the strip insertion sensor sensing at least a portion of the test strip internally received in the slot, initiates a pre-set timer countdown; and in response to the pre-set timer countdown completion, display a second simulated medical value of the plurality of simulated values.

Clause 9: The simulated medical device of any of clauses 1-8, wherein the microprocessor can be configured to set values of the simulated medical values in the memory based at least in part on user input.

Clause 10: The simulated medical device of any of clauses 1-9 can further comprise: an interface; wherein the interface can receive wireless signals including data from an external wireless transmitter; wherein the interface can provide the data included in the received wireless signals to the microprocessor; and wherein the microprocessor can be configured to set the values of the at least one simulated medical value based at least in part on the data included in the received wireless signals.

Clause 11: Also disclosed is a method for providing a realistic training environment for health care and patient care providers using a simulated medical device, the method comprising: (a) actuating a first actuator of the simulated medical device that turns on the simulated medical device; (b) following step (a), actuating a second actuator of the simulated medical device; (c) in response to the actuation of the second actuator, prompting the user to simulate scanning a first bar code.

Clause 12: The method of clause 11, can further comprise: (d) in response to the prompt in step (c), actuating a third actuator; and (e) in response to the actuation of the third actuator, causing a light of the simulated medical device to illuminate.

Clauses 13. The method of clause 11 or 12, can further comprise: (f) following step (e), inserting a test strip into a slot of the simulated medical device; (g) in response to the insertion of the test strip into the slot, a pre-set timer countdown is initiated; and in response to the completion of the pre-set timer countdown, the simulated medical device can display on a visual display a simulated medical value.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

Further features and other objects and advantages will become apparent from the following detailed description made with reference to the drawings in which.

DETAILED DESCRIPTION OF THE INVENTION

Figure 1A:
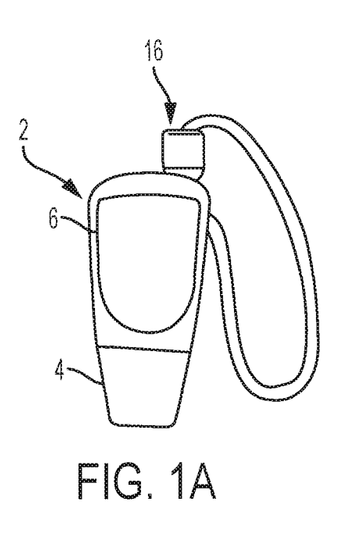
FIG. 1A is a front view of a simulated thermometer according to a preferred and non-limiting embodiment.
Figures 1B, 1C:
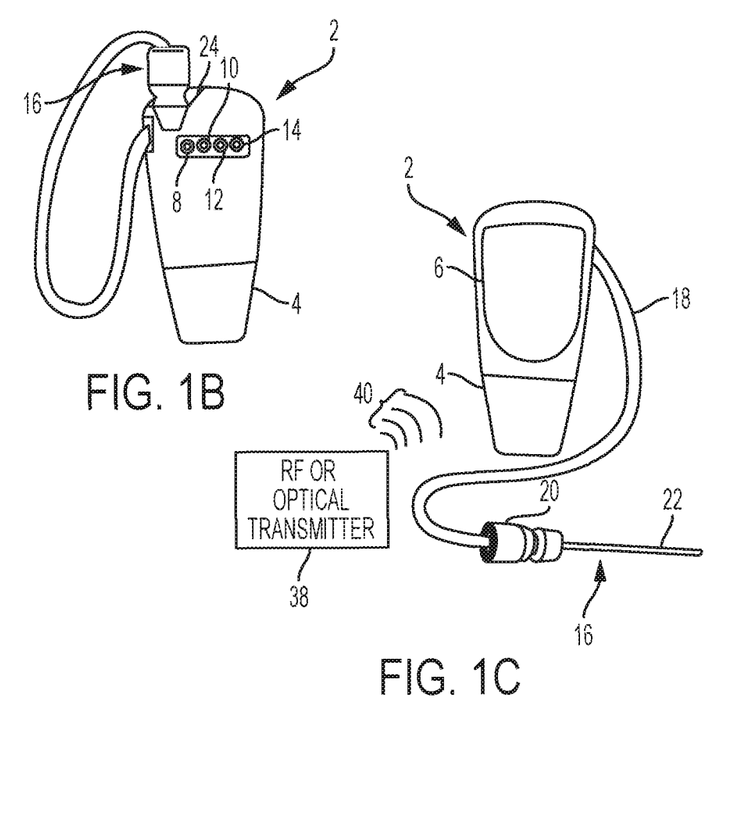
FIG. 1B is a back view of a simulated thermometer according to a preferred and non-limiting embodiment.
FIG. 1C is an expanded front view of a simulated thermometer according to a preferred and non-limiting embodiment.

Simulated Thermometer:

FIGS. 1A and 1B, respectively, show front and back views of a simulated thermometer 2. Although preferred and non-limiting embodiments are described below with respect to a simulated thermometer for the display of simulated temperatures, disclosed embodiments are not limited thereto, and it is further envisioned that simulated thermometer 2 may be configured to display other simulated values. The simulated thermometer 2 includes a body 4 which houses a printed circuit board (PCB) which supports circuitry including a visual display 6 which is visible through an opening in a front side of body 4. The PCB further supports a plurality of buttons or switches including a first button 8, a second button 10, a third button 12, and/or a fourth button 14. The first through fourth buttons 8-14 are accessible to a user of the simulated thermometer 2 via one or more openings on a back side of body 4.

With reference to FIG. 1C and with continuing reference to FIGS. 1A and 1B, the simulated thermometer 2 further includes a simulated thermometer probe 16, which is physically coupled to body 4 via a coiled cable 18. For reasons discussed hereinafter, the probe 16 is not coupled to any signal processing circuitry of the simulated thermometer 2. For example, the probe 16 is not configured to record or send any signal representative of a reading or measured value to the PCB for processing. The probe 16 has a proximal end 20 adapted to be held by the hand of the user and a distal end 22 that is similar in shape and size to an end of a conventional thermometer used for taking temperatures of patients. Because the probe 16 is not actually used for taking temperatures, the distal end 22 of probe 16 can be made of any suitable and/or desirable material that is, desirably, biocompatible.

The body 4 may include an optional integral sheath 24 for receiving the distal end 22 of probe 16 with the proximal end 20 supported above a mouth of the sheath 24. When it is desired to deploy the probe 16 from a position within sheath 24, a user grasps the proximal end 20 of probe 16 and pulls the distal end 22 out of the sheath 24.

Figure 2:
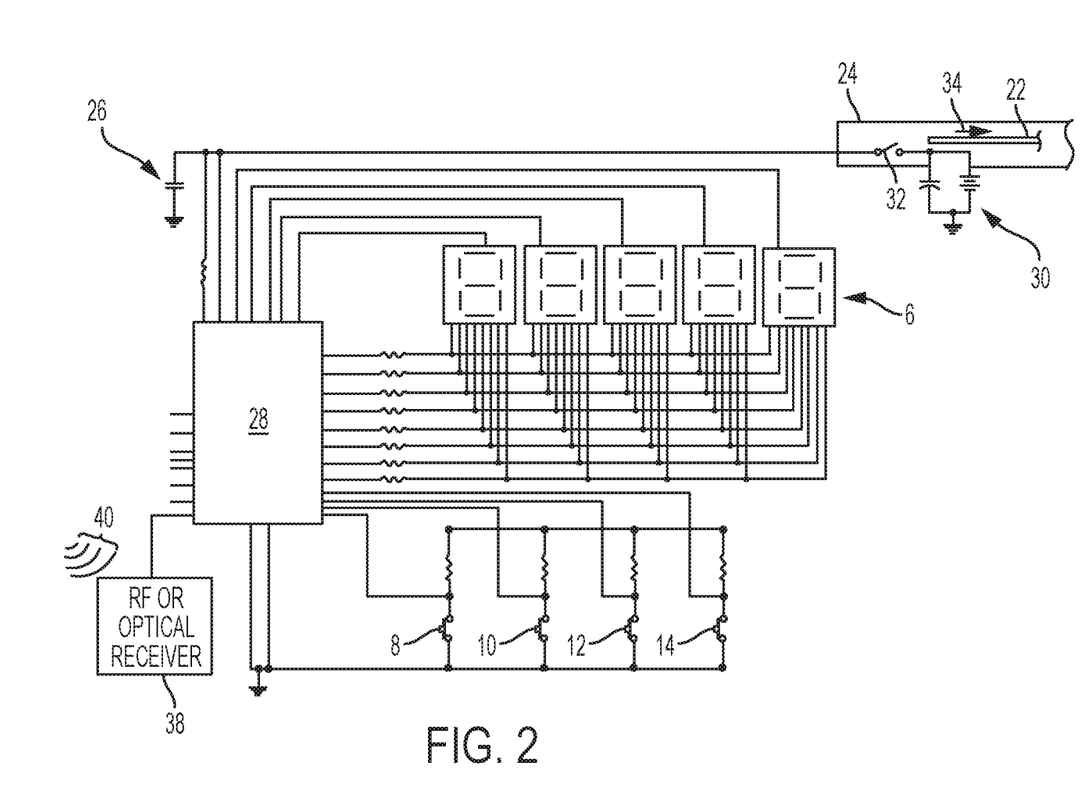
FIG. 2 is a circuit diagram of a simulated thermometer according to a preferred and non-limiting embodiment.

Referring now to FIG. 2 and with continuing reference to FIGS. 1A-1C, circuitry 26 housed on the PCB within the body 4 includes an integrated control microprocessor 28, which is coupled to visual display 6 and the first through fourth buttons 8-14. The microprocessor 28 is connected to a DC power supply 30 via a switch 32. The circuitry 26 further includes biasing resistors and capacitors which are utilized in a manner known in the art, but which are not specifically described herein for the purpose of simplicity.

The visual display 6 may be any suitable and/or desirable form of display including an LED display, an LCD display, an OLED display, etc. In a preferred and non-limiting embodiment illustrated in FIG. 2, the visual display 6 comprises five 7-segment LEDs; however, preferred embodiments are not to be construed as limited thereto.

A switch 32 is positioned within sheath 24, such that when the distal end 22 of probe 16 is inserted into sheath 24, the distal end 22 of probe 16 causes the switch 32 to be in an open state. Upon removal of distal end 22 of probe 16 from the sheath 24, the switch 32 assumes a closed state completing an electrical path between the DC power supply 30 and the microprocessor 28.

The microprocessor 28 may be a completely integrated processor that includes an integral microprocessor, memory, input and output drivers, etc. as required in order to drive the visual display 6 and to receive and process inputs from the first through fourth buttons 8-14. The memory of microprocessor 28 is configured to store non-transitory computer readable program code that the processor of microprocessor 28 executes and runs under the control of.

In operation, in response to the removal of the probe 16 from the sheath 24, the switch 32 assumes its closed state connecting the DC power supply 30 to the microprocessor 28. In response to receiving power from the DC power supply 30, the processor of microprocessor 28, under the control of the non-transitory computer readable program code stored in the memory of microprocessor 28, initializes and commences operation in the manner next described.

In operation, upon closure of switch 32, the processor of microprocessor 28 initializes and causes the visual display 6 to display simulated temperatures that alternate or cycle between at least two programmed temperatures T1 and T2 each time the switch 32 cycles from an open state to a closed state. The simulated thermometer 2 is activated in response to removing the probe 16 from the sheath 24, whereupon the switch 32 cycles from an open state to a closed state and electrical power is supplied from the DC power supply 30 to the microprocessor 28. The DC power supply 30 may be any suitable and/or desirable form of DC power supply, including replaceable or rechargeable batteries.

In response to the microprocessor 28 powering on, the microprocessor thereof loads previously stored settings from the memory (e.g., an EEPROM) and, depending upon an acquisition time and a display mode, a temperature is displayed on the visual display 6. The displayed temperature is one of a plurality of different temperatures stored in the EEPROM, e.g., the temperature T1 or the temperature T2. The next time power is cycled to microprocessor 28, the other temperature T2 or T1 which is stored in the EEPROM is displayed on the visual display 6. The visual display 6 may be configured to display temperatures in degrees Celsius or Fahrenheit. For example, the rightmost LED in the visual display 6 shown in FIG. 2 may be configured to display a "C" for Celsius or a "F" for Fahrenheit.

The first through fourth buttons 8-14 may be utilized to program the microprocessor 28 with the values of the temperature T1 (e.g., first button 8), the temperature T2 (e.g., second button 10), the acquisition time (e.g., third button 12), and the display mode Celsius/Fahrenheit (C/F) (e.g., fourth button 14). For example, pressing or pressing and holding first button 8 causes temperature T1 stored in the memory (EEPROM) of microprocessor 28 to increase and be displayed on visual display 6 until a maximum temperature (e.g., 42° C. or 107° F.) is reached, whereupon temperature T1 rolls over to the lowest temperature to be displayed, e.g., 35° C. or 95° F.

Pressing or pressing and holding second button 10 causes temperature T2 stored in the memory of microprocessor 28 to increase and be displayed on visual display 6 to a maximum temperature (42° C. or 107° F.), whereupon the temperature rolls over to the lowest temperature, e.g., 35° C. or 95° F. In the case of first button 8 and second button 10, each press of the button can cause the corresponding temperature T1 and T2 stored in the memory of microprocessor 28 to increase by some predetermined value, e.g., 0.1° C. or 0.1° F., or pressing and holding each button can cause the corresponding temperature T1 and T2 to automatically increase by the predetermined value.

Pressing third button 12 causes the acquisition time stored in the memory of microprocessor 28 to increase until it reaches a maximum acquisition time, e.g., fifteen seconds, whereupon the acquisition time rolls over to a minimum acquisition time, e.g., five seconds. This acquisition time is the delay time between when probe 16 is removed from sheath 24 and the microprocessor 28 first receives power from DC power supply 30 until the time that a temperature T1 or T2 is displayed on the visual display 6. Each press of third button 12 can cause the acquisition time to change by a predetermined amount, e.g., 0.1 second or 1.0 second, or pressing and holding third button 12 can cause the acquisition time to automatically increase by the predetermined amount.

Each press of fourth button 14 cycles the display mode between Celsius and Fahrenheit.

Although programming of the microprocessor 28 is described above with respect to use of the first through fourth buttons 8-14, preferred embodiments are not limited thereto and the microprocessor 28 may be programmed through other user input means, for example, a touch screen control or graphical user interface (GUI). Moreover, although the first through fourth buttons 8-14 are described with respect to programming temperature values for the simulated thermometer 2, it is also envisioned that the buttons or other user interface may be configured to program other simulated values, such as blood glucose, pulse oximeter measurements, and the like.

The simulated thermometer 2 can be used in training scenarios of health care or patient care providers. An example user of the simulated thermometer 2 by health care or patient care providers in connection with an individual playing the role of a patient will now be described.

In this example, the person playing the role of the patient presents to the health care or patient care providers complaining of an elevated temperature, nausea, and vomiting. It is to be appreciated that in this role-playing scenario, the person playing the role of the patient does not have an elevated temperature, is not nauseous, and is not vomiting, but rather is simply complaining of these symptoms.

The health care or patient care providers perform a physical assessment of the patient including taking vital signs and the patient's temperature. One of these vital signs is simulated temperature(s) of the patient taken utilizing the simulated thermometer 2. In this regard, the probe 16 is removed from sheath 24, a probe cover (not shown) is placed over the distal end 22 of the probe 16, and the distal end 22 of the probe 16 with the probe cover in place is inserted into the mouth of the role playing patient. After a period of time determined by the acquisition time programmed into microprocessor 28 via the third button 12, the microprocessor 28 causes the visual display 6 to display the first programmed temperature T1, e.g., 103° F., as the first simulated temperature reading. It is to be appreciated that since probe 16 is not connected to any internal circuitry of simulated thermometer 2, the temperature experienced by the distal end 22 of probe 16 has no bearing on or relation to the temperature displayed on the visual display 6. Rather, the temperature T1 displayed on visual display is the temperature T1 that was programmed into the memory of the microprocessor 28.

After logging the displayed temperature T1 as well as any other vital signs of the role playing patient, the health care or patient care providers make a diagnosis based on the results of the vital signs, including the temperature displayed on the visual display 6, and other patient data made part of the simulation. After taking the first simulated temperature reading, the probe 16 is replaced into sheath 24 after removing the probe cover. Thereafter, the patient is given a course of treatment, albeit simulated or actual, by the health care or patient care providers based on the diagnosis.

After a period of time determined by the simulation, the health care or patient care providers take a second simulated temperature of the role playing patient by removing the probe 16 from the sheath 24, placing a probe cover (not shown) over the distal end 22 of probe 16, and again inserting the distal end 22 of probe 16 with the probe cover in place into the mouth of the role playing patient. After a period of time determined by the acquisition time programmed into microprocessor 28, the microprocessor 28 causes the visual display 6 to display the second temperature T2 programmed into the memory of microprocessor 28. Depending on the simulation, temperature T2 may be higher or lower than temperature T1. In this example, the temperature T2 displayed on the visual display 6 is 101.5° F., which is lower than temperature T1, i.e., 103° F. In response to taking this temperature, the health care or patient care providers may conclude that the health care or patient care providers' course of treatment is working.

As can be seen, cycling probe 16 into and out of sheath 24 causes the temperature that the microprocessor 28 displays on the visual display 6 to alternate between the temperature T1 and T2, which alternating temperatures can be utilized for the purpose of training health care or patient care providers. Again, it is to be appreciated that probe 16 is only a simulated probe and is not actually utilized to measure temperature.

According to another preferred and non-limiting embodiment, the simulated thermometer 2 may include a remote RF or optical transmitter 36 (FIG. 1C) and an RF or optical receiver 38 (FIG. 2) as an integral part of the simulated thermometer 2 for receiving radio frequency or optical signals 40 from the transmitter 36. The combination of transmitter 36 and receiver 38 can be utilized to remotely program the memory of microprocessor 28 with one or more values of temperature T1, temperature T2, and/or acquisition time, and/or to toggle the visual display 6 between Celsius and Fahrenheit. The combination of transmitter 36 and receiver 38 can either be utilized in addition or, alternatively, to buttons 8-14. However, it is envisioned that the functions provided by buttons 8-14 may be replaced with the combination of the transmitter 36 and the receiver 38.

One advantage of the use of the transmitter 36 and the receiver 38 includes the ability of an instructor participating in the role playing between a role playing patient and the health care or patient care providers to change the second display temperature based upon the health care or patient care providers' course of treatment of the patient. For example, assuming that the health care or patient care providers' treatment plan was appropriate, the instructor may chose to leave the second programmed temperature T2 at a lower value than the first programmed temperature T1, as discussed in the above example. However, if the health care or patient care providers make an incorrect diagnosis and prescribe an improper course of treatment, the instructor utilizing transmitter 36 may change the second temperature T2 to be the same or a higher temperature, e.g., 103.5° F., indicating that the course of treatment is not working. The combination of the transmitter 36 and the receiver 38 can be utilized to change any of the values programmed into the memory of microprocessor 28 at any time the microprocessor 28 is receiving power from DC power supply 30, including during the acquisition time preprogrammed into microprocessor 28.

Figure 3A:
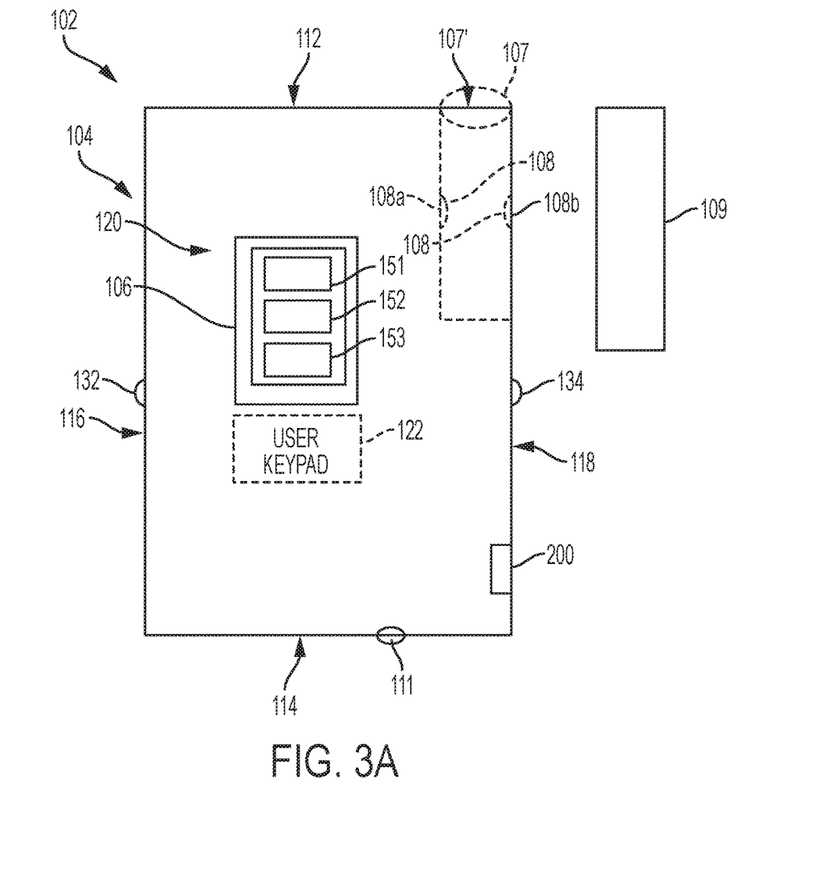
FIG. 3A is a front view of a simulated glucose strip reader according to a preferred and non-limiting embodiment.
Figure 3B:
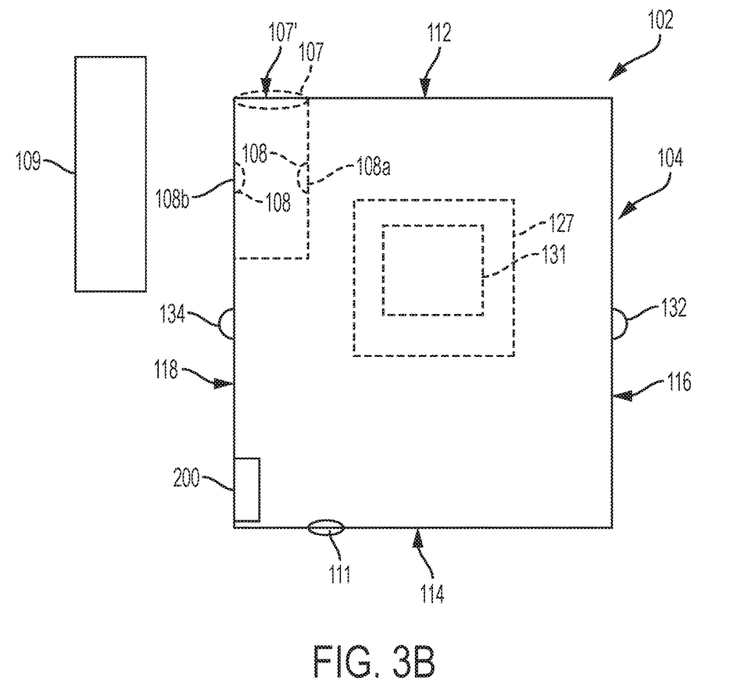
FIG. 3B is a back view of a simulated glucose strip reader of FIG. 3A.

Simulated Glucose Strip Reader:

FIGS. 3A and 3B, respectively, show front and back views of an instrument 102 for the simulated measurement of the concentration of glucose in a simulated blood sample (hereinafter "instrument") and display of the results of the simulated measurement similar in many respects to simulated thermometer 2 in FIGS. 1A-1C. Although preferred and non-limiting embodiments are described below with respect to instrument 102 for the display of one or more simulated medical values, in an example, a blood glucose level, from a plurality of simulated blood glucose levels, the disclosed embodiment is not limited thereto. It is envisioned that instrument 102 can also or alternatively be configured to display other simulated values or information, such as, for example, "Pass" or "Fail". Instrument 102 is intended for use in a training environment, not a clinical environment.

Instrument 102 includes a body 104 which houses a printed circuit board (PCB) 127 (shown in phantom FIG. 3B) which supports circuitry 131 (shown in greater detail in FIG. 4B) including a Human Machine Interface (HMI) 120 that includes a visual display 106 which is visible through an opening in a front side of body 104. In an example, visual display 106 can be a touchscreen display that can display, for example, virtual buttons or actuators that facilitate user interaction with microprocessor 128. However, this is not to be construed in a limiting sense since the use of a mechanical keypad and/or one or more mechanical buttons or actuators or other user input means known in the art is envisioned.

As viewed in FIG. 3A, body 104 includes a top 112, a bottom 114, a left side 116, and a right side 118. In an example, PCB 127 supports a plurality of actuators including a first actuator 132, shown, for example, located on left side 116 of body 104, and a second actuator 134, shown, for example, located on right side 118 of body 104.

With continuing reference to FIGS. 3A and 3B, instrument 102 can further include or define a slot 107 that can include an opening 107', in an example, in top 112 of body 104 and can have a light 111, in an example, on bottom 114 of body 104. In another example, instrument 102 can further include a speaker 200 shown, in an example, in FIGS. 3A and 3B on right side 118. Instrument 102 can also include a strip insertion sensor 108 in slot 107. In an example, strip insertion sensor 108 can include a light transmitter 108a spaced across a gap from a light receiver 108b within slot 107. Strip insertion sensor 108 can be configured to provide to microprocessor 128 an indication when at least a portion of a simulated test strip 109, e.g., a strip of paper, is inserted in slot 107 in said gap. Slot 107 is configured to receive at least a portion of test strip 109. In another example, strip insertion sensor 108 can be a mechanical switch.

Figure 4A:
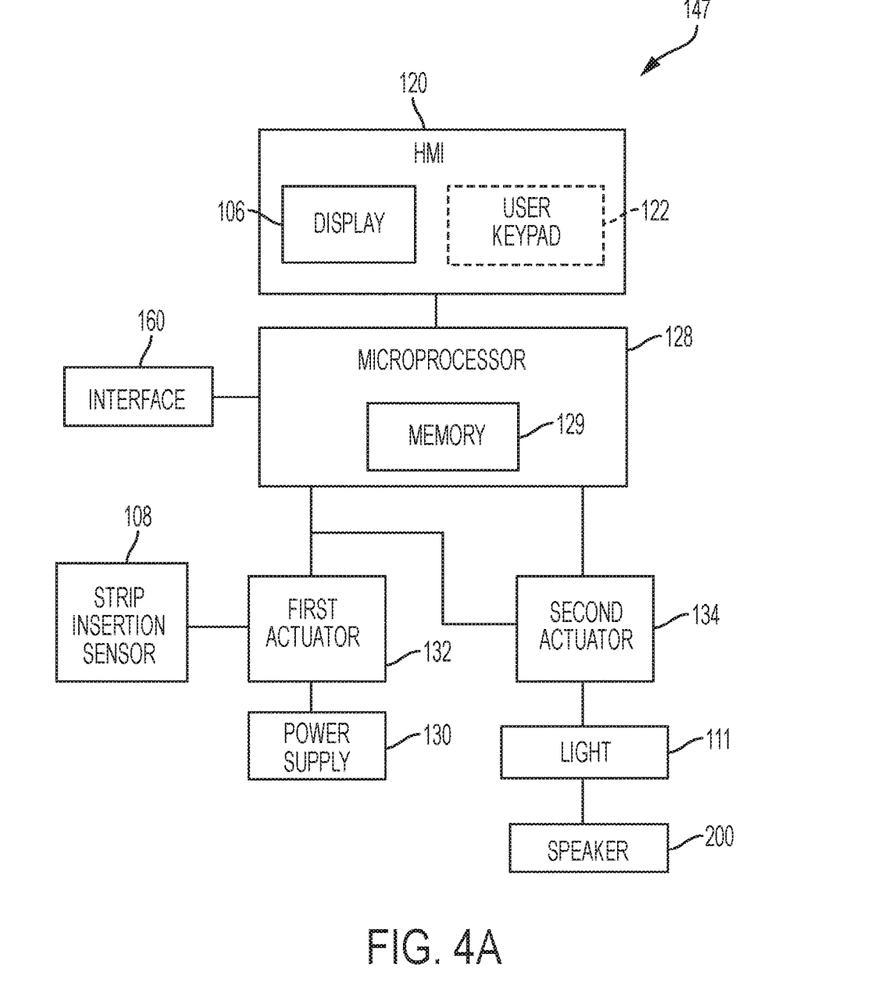
FIG. 4A is a block diagram of the electronics of the simulated glucose strip reader of FIGS. 3A-3B.
Figure 4B:
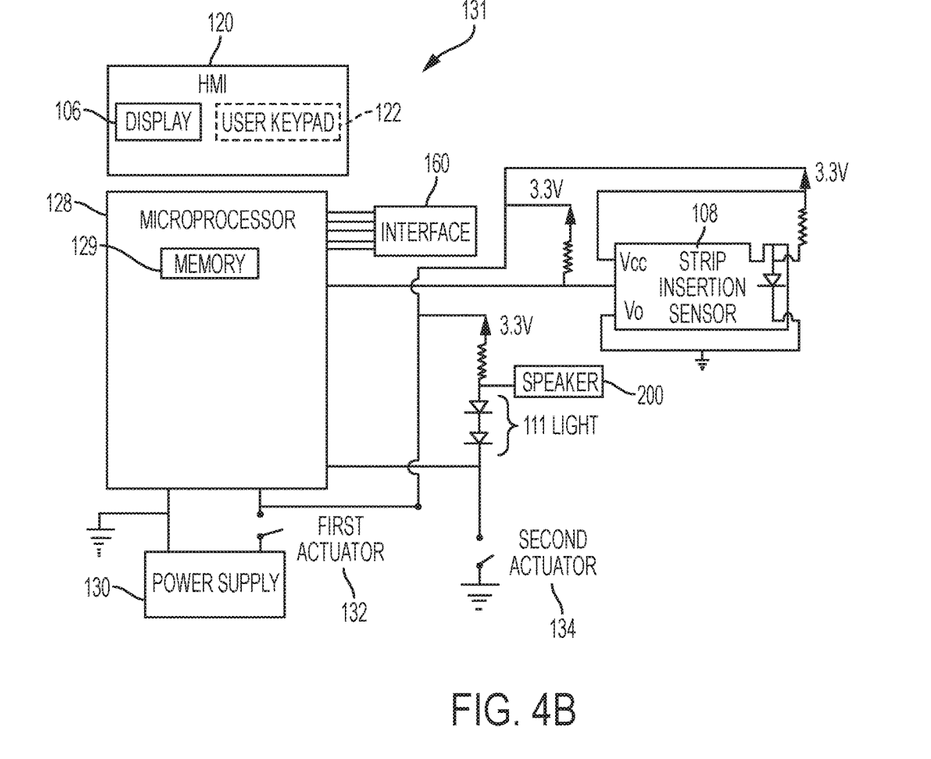
FIG. 4B is a combined block diagram and circuitry schematic view of the electronics of the simulated glucose strip reader of FIGS. 3A-3B.

Referring now to FIGS. 4A and 4B and with continuing reference to FIGS. 3A and 3B, circuitry 131 housed within body 104 includes an integrated control microprocessor 128, having, in an example, an integral memory 129. Microprocessor 128 is coupled to HMI 120 and visual display 106 and to first and second actuators 132 and 134. Microprocessor 128 is also connected to a DC power supply 130 via first actuator 132, such that when first actuator 132 is actuated (to a closed state), power flows from power supply 130 to microprocessor 128 and allows for instrument 102 to turn ON. Power supply 130 can be any suitable and/or desirable form of a power supply, including replaceable or rechargeable batteries. In an example, power supply 130 can be a Li battery (i.e., charge for 2 hours to supply power for 8 hours). Circuitry 131 can further include biasing resistors and a light 111 (e.g., one or more LEDs), and can further include speaker 200, which are utilized in a manner known in the art, but which are not specifically described herein for the purpose of simplicity. In an example, each actuator described herein can be a mechanical actuator or switch or a virtual actuator that can be displayed on visual display 106, which can be a touchscreen display, and which can be used in the manner described hereinafter to perform the functions described herein. For the purpose of description, the first and second actuators will be described as being mechanical switches. However, this is not to be construed in a limiting sense.

In another example, Human Machine Interface 120 can include visual display 106 in the nature of a non-touchscreen display, such as, for example, an LED display, a LCD display, an OLED display, a five 7-segment LED display (like the five 7-segment LED display shown in FIG. 2), etc. Where Human Machine Interface 120 includes a visual display 106 that is a non-touchscreen display, Human Machine Interface 120 can also include a user keyboard or keypad 122 (shown in phantom in FIG. 3A) to facilitate user interaction with microprocessor 128. The use of virtual actuators displayed on visual display 106 in the nature of a touchscreen display and/or keypad 122 including mechanical actuators (buttons) in combination with a touchscreen and/or non-touchscreen display is envisioned.

For the purpose of description hereinafter, first and second actuators 132 and 134 will be described as mechanical buttons or actuators, while actuators displayed on visual display 106 will be understood to be virtual actuators displayed on visual display 106 in the nature of a touchscreen display. However, this is not to be construed in a limiting sense.

With continuing reference to FIGS. 3A-4B, in operation, electrical power is applied to microprocessor 128 from power supply 130 in response to first actuator 132 being actuated and latching in a closed state. Upon de-actuation, first actuator 132 unlatches and returns to an open state. The description of actuator 132 being a latching actuator is not to be construed in a limiting sense.

Upon receiving electrical power, microprocessor 128 can display on visual display 106 an idle screen for a period of time while microprocessor 128 initializes, and then can display three user selectable actuators (FIG. 3A): configuration actuator 151, quality control actuator 152, and patient test actuator 153. In an example, microprocessor 128 can be coupled to an interface 160, such that one or more user inputted values 140 (shown in FIG. 5) can be transferred from interface 160 to microprocessor 128 (details regarding interface 160 and inputted values 140 will be described hereinafter). In an example, user inputted values 140 can be inputted manually via Human Machine Interface 120 by a user in the configuration mode (discussed hereinafter). In another example, user input values 140 can be sent wirelessly from an external wireless transmitter 136 (FIG. 5) to interface 160, similar to receiving radio frequency or optical signals 40 from transmitter 36 in FIG. 1C, to be used with microprocessor 28 in FIG. 2. Values 140 can be used, for example, to replace or add to simulated medical values stored in memory 129, input high and low quality test values, or input configuration values. In an example, once first actuator 132 has been actuated (to a closed state), in response to second actuator 134 being actuated to a closed state, light 111 is illuminated and speaker will sound via power from power supply 130 and light 111 can be used to simulate bar code scanning. In an example, second actuator 134 is non-latching, whereupon a user de-actuating second actuator 134, it returns to an open state. The description of second actuator 134 as being a non-latching is not to be construed in a limiting sense. In an example, speaker 200 can be operative for sounding after a predetermined period of time (i.e., 3 seconds) after second actuator 134 is actuated and the sound can, for example, represent a "BEEP".

With continuing reference to FIGS. 4A and 4B, when test strip 109 is inserted into slot 107 (shown in FIGS. 3A and 3B), for example, into the gap between light transmitter 108*a* and light receiver 108*b*, blocking the light received by light receiver 108*b* from light transmitter 108*a*, microprocessor 128 can sense the change in output of light receiver 108*b* in response to light receiver receiving and not receiving light from light transmitter 108*a* and can display, after a predetermined period of time, on visual display 106, a simulated medical value retrieved from the plurality of simulated medical values, or a "Pass" or "Fail" indication, retrieved from memory 129. The simulated medical value or indication can be preselected or random. Electrical power is supplied to light transmitter 108*a* and light receiver 108*b* when first actuator 132 is actuated.

Figure 5:
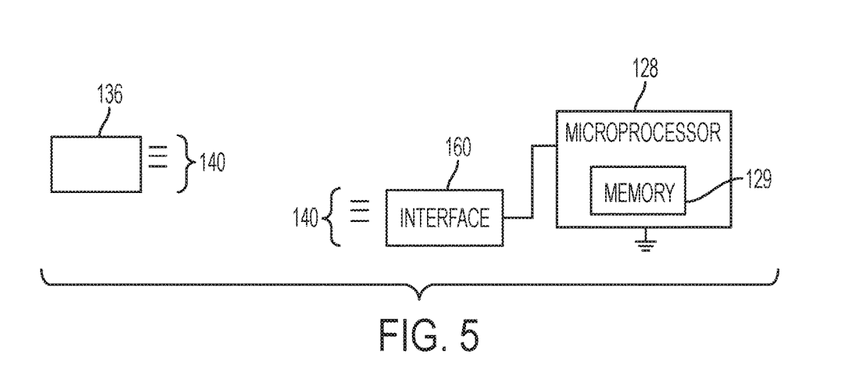
FIG. 5 is an isolated view of a wireless transmitter and the interface of the simulated glucose strip reader for inputting external values into memory of the simulated glucose strip reader.

Referring now to FIG. 5, in an example, interface 160 can be a wireless receiver which can wirelessly receive data or values 140 embedded in wireless signals received from external wireless transmitter 136 to be sent to microprocessor 128 for storing in memory 129. In an example, this combination of transmitter and receiver can be utilized to remotely program memory 129 of microprocessor 128 with, for example, one or more simulated medical values and/or data to replace or be added to simulated medical values and/or data stored in memory 129. In an example, wireless interface 160 can be an RF or optical receiver and wireless transmitter 136 can be an RF or optical transmitter.

With reference to the flow diagram of FIG. 6, an example use of instrument 102 will now be described. In this example, visual display 106 will be described as being a touchscreen display and first and second actuators will be considered as being mechanical switches. However, this is not to be construed in a limiting sense.

In response to first actuator 132 being actuated at step 100, microprocessor 128 receives electrical power from power supply 130 and, after an initialization period, microprocessor 128 can display on visual display 106 the user selectable options (shown in FIG. 3A) configuration actuator 151; quality control actuator 152; and patient test actuator 153 at step 105.

Figure 6:
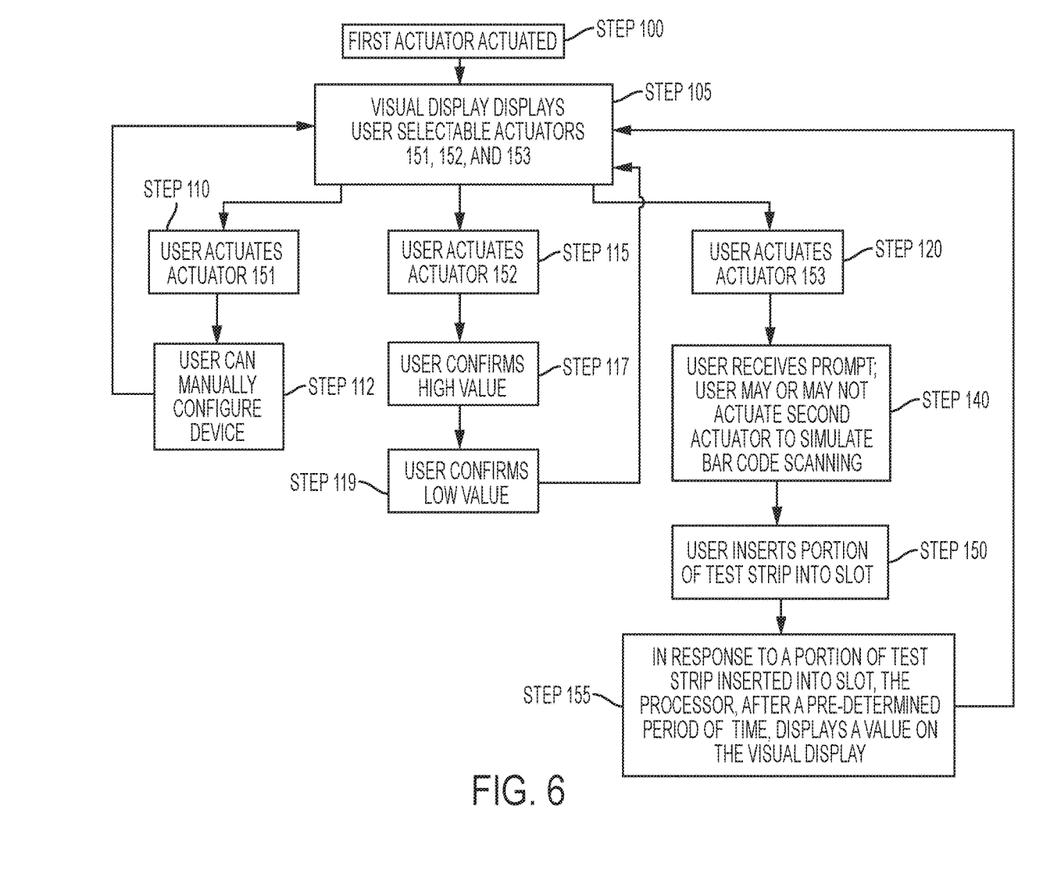
FIG. 6 is a flow diagram of the operation of the simulated glucose strip reader.

With continuing reference to FIG. 6, in response to user actuation of configuration actuator 151, at step 110, microprocessor 128 can display on visual display 106 a configuration display (not shown). Through this configuration display, microprocessor 128 enables the user to manually input data, such as, for example, one or more simulated medical values (e.g., simulated blood glucose levels) and/or text into memory 129, in effect 'configure the device' at step 112, whereupon the displayed values and/or text (discussed hereinafter) in a patient test mode can optionally be based at least in part on the inputted data. Upon completion of the user manually inputting data, microprocessor 128 can then return to step 105. The display of configuration actuator 151 and the execution of steps 110 and 112 can be optional if memory 129 is preloaded with one or more simulated medical values and/or text. In another example, the user input can be numerical values with three (3) decimals to the left of a decimal point and two (2) decimal points to the right. In another example, the user input can represent simulated blood glucose values.

With continuing reference to FIG. 6, in response to user actuation of quality control actuator 152 at step 115, microprocessor 128 can display on visual display 106 a quality control display (not shown) at step 115. Via the quality control display, microprocessor 128 enables the user to input and confirm data, such as, for example, a first (high) value of the simulated medical values (e.g. a high glucose level) at step 117 and a second (low) value of the simulated medical values (e.g. a low glucose level) at step 119 or "PASS" and/or "FAIL" indication. Microprocessor 128 can then return to step 105. The display of quality control actuator 152 and the execution of steps 115-119 can be optional if memory 129 is preloaded with data, e.g., a first (high) value of simulated medical values and a second (low) value of simulated medical values, and/or "PASS" and/or "FAIL" indications.

With continuing reference to FIG. 6, in response to user actuation of patient test actuator 153 at step 105, microprocessor 128 can be programmed to display on visual display 106 a first prompt to the user to simulate scanning a first bar code at step 140. In an example, the user can simulate this bar code scanning by actuating second actuator 134, whereupon light 111 can be illuminated and speaker can 200 sound. More specifically, in use, after actuating second actuator 134 resulting in illuminating light 111 and sounding speaker 200, it is intended for the user to simulate bar code scanning of a bar code of the user, for example, a bar code of a wrist band of the user. When the user completes simulated scanning of the user bar code, the user de-actuates or releases second actuator 134 which causes light 111 to turn off. In use, it is intended that the user actuate second actuator 134 a second time which causes light 111 to illuminate a second time and speaker 200 to sound a second time, whereupon the user can simulate scanning the patient bar code. Once the user has simulated scanning the patient bar code, the user de-actuates or releases second actuator 134 a second time. In use, the user then inserts at least a portion of test strip 109 into slot 107. In response to strip insertion sensor 108 detecting insertion of at least a portion of test strip 109 into slot 107, at step 155, microprocessor 128 can be programmed to display, after a predetermined period of time, on visual display 106 a first simulated medical value (glucose level) or a "PASS" or "FAIL" indication retrieved by microprocessor 128 from data stored in memory 129. Microprocessor 128 can then return to step 105.

If desired, the process of executing steps 120-155 can be repeated any number of additional times as an aid to training the user in the use of an actual glucose strip reader used in a clinical environment. In an example, each time steps 120-155 are repeated, the same or a different simulated medical value (glucose level) or "PASS" or "FAIL" stored in memory 129 can be displayed on display 106 in step 155. In an example, each time steps 120-155 are repeated, instrument 102 can display on display 106 a different simulated medical value (glucose level) from the set of simulated medical values stored in memory 129. In another example, each time steps 120-155 are repeated, a "PASS" or "FAIL" indication can display on display 106, simulating that the simulated measured blood glucose is within "PASS" or outside "FAIL" of an acceptable level. This latter example display of "PASS" or "FAIL" is similar to a display of data in an actual glucose strip reader used in a clinical environment. However, this is not to be construed in a limiting sense.

In another example, when test strip 109 is inserted into slot 107, strip insertion sensor 108 can determine if test strip 109 is not inserted correctly or does not include a sufficient amount of simulated blood thereon. Microprocessor 128 can then display this condition on visual display 106.

In an example, manual user input (steps 110 and 112) or wireless interface 160 can be used to program new, replacement, or additional data, such as, for example, simulated medical values (glucose levels) or data into memory 129.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. Obvious modifications and alterations will occur to others upon reading and understanding the preceding detailed description. For example, it is to be understood that the present invention contemplates that, to the extent possible, one or more features of any embodiment can be combined with one or more features of any other embodiment or aspect.

The invention claimed is:

1. A simulated medical device for providing a realistic training environment for health care or patient care providers, the device comprising:
   a visual display;
   a microprocessor connected to the visual display;
   a memory connected to the microprocessor and storing non-transitory computer readable program code for operation of the microprocessor and a plurality of simulated medical values;
   a first actuator connected between a power supply and the microprocessor, wherein in response to actuation of the first actuator the microprocessor receives power from the power supply;
   a body housing the visual display, the microprocessor, the memory, and the first actuator, the body further including: a slot in the body, a light supported by the body, and a strip insertion sensor configured to provide to the microprocessor an indication of the presence of a test strip in the slot; and
   a second actuator connected between the power supply and the light, wherein the light illuminates in response to actuation of the second actuator, wherein:
   the microprocessor, running under the control of the non-transitory computer readable program code, performs the following steps:
      in response to receiving power from the power supply, displays on the visual display a third actuator;
      in response to actuation of the third actuator, displays a prompt on the visual display;
      in response to the strip insertion sensor sensing at least a portion of the test strip internally received in the slot, initiates a pre-set timer countdown; and
      in response to the pre-set timer countdown completion, displays on the visual display a first simulated medical value of the plurality of simulated medical values.

2. The simulated medical device of claim 1, wherein the first actuator is a mechanical switch.

3. The simulated medical device of claim 1, wherein the slot is configured to receive internally at least a portion of the test strip.

4. The simulated medical device of claim 1, wherein the light is positioned at a proximal end of the slot.

5. The simulated medical device of claim 1, wherein the second actuator is a mechanical switch or a virtual switch displayed on the visual display by the microprocessor operating under the control of the non-transitory computer readable program code.

6. The simulated medical device of claim 1, wherein the microprocessor, running under the control of the non-transitory computer readable program code, further performs the following steps:
   in response to another actuation of the third actuator, displays another prompt on the visual display;
   in response to the strip insertion sensor sensing at least a portion of the test strip internally received in the slot, initiates the pre-set timer countdown; and
   in response to the pre-set timer countdown completion, displays on the visual display a second simulated medical value of the plurality of simulated medical values.

7. The simulated medical device of claim 1, wherein the microprocessor is configured to set values of the simulated medical values in the memory based at least in part on user input.

8. The simulated medical device of claim 1, further comprising:
   an interface;
   wherein the interface receives wireless signals including data from an external wireless transmitter;
   wherein the interface provides the data included in the received wireless signals to the microprocessor; and
   wherein the microprocessor is configured to store in the memory the values of the at least one simulated medical value based at least in part on the data included in the received wireless signals.

9. A method for providing a realistic training environment for health care and patient care providers using a simulated medical device, the method comprising:
   (a) actuating a first actuator of the simulated medical device that turns on the simulated medical device;
   (b) following step (a), actuating a second actuator of the simulated medical device;
   (c) in response to the actuation of the second actuator, prompting the user to simulate scanning a first bar code;
   (d) in response to the prompt in step (c), actuating a third actuator;
   (e) in response to the actuation of the third actuator, causing a light of the simulated medical device to illuminate;
   (f) following step (e), inserting a test strip into a slot of the simulated medical device;

(g) in response to the insertion of the test strip into the slot, a pre-set timer countdown is initiated; and
(h) in response to the completion of the pre-set timer countdown, the simulated medical device displaying on a visual display a simulated medical value.

* * * * *